United States Patent [19]

Rommel

[11] Patent Number: 4,978,444
[45] Date of Patent: Dec. 18, 1990

[54] WATER PURIFIER FOR AQUARIUMS

[76] Inventor: Joseph L. Rommel, 76 A Brandywyne East, Brielle, N.J. 08730

[21] Appl. No.: 380,193

[22] Filed: Jul. 14, 1989

[51] Int. Cl.$^5$ ........................ B01D 29/05; B01D 35/02
[52] U.S. Cl. ........................................ 210/169; 119/5; 210/295; 210/416.2
[58] Field of Search ..................... 210/169, 416.2, 295; 119/5

[56] References Cited

U.S. PATENT DOCUMENTS

| | | | |
|---|---|---|---|
| 1,247,381 | 10/1969 | Halpert | 210/169 |
| 2,748,075 | 5/1956 | Hovlid | 210/169 |
| 2,935,199 | 5/1960 | Willinger | 210/160 |
| 3,006,476 | 6/1959 | Halpert | 210/169 |
| 3,135,238 | 6/1964 | Eyl | 210/169 |
| 3,516,544 | 6/1970 | Sesholtz | 210/169 |
| 4,035,298 | 7/1977 | Cloke et al. | 210/416.2 |
| 4,076,619 | 2/1978 | Howery | 210/169 |
| 4,265,751 | 5/1981 | Willinger | 210/416.2 |
| 4,851,112 | 7/1989 | Schlensker | 210/416.2 |

Primary Examiner—W. Gary Jones
Assistant Examiner—Robert A. Simpson
Attorney, Agent, or Firm—Joel F. Spivak

[57] ABSTRACT

An aquarium water purification system comprises a porous or slotted platform raised from the bottom of the aquarium. A low density foam member having land areas and openings therein is affixed to the bottom of the platform. The foam member promotes bacterial retention and growth thereon of waste metabolizing bacteria. Means are also provided to circulate the water from the aquarium through the foam member and through an external filter.

19 Claims, 3 Drawing Sheets

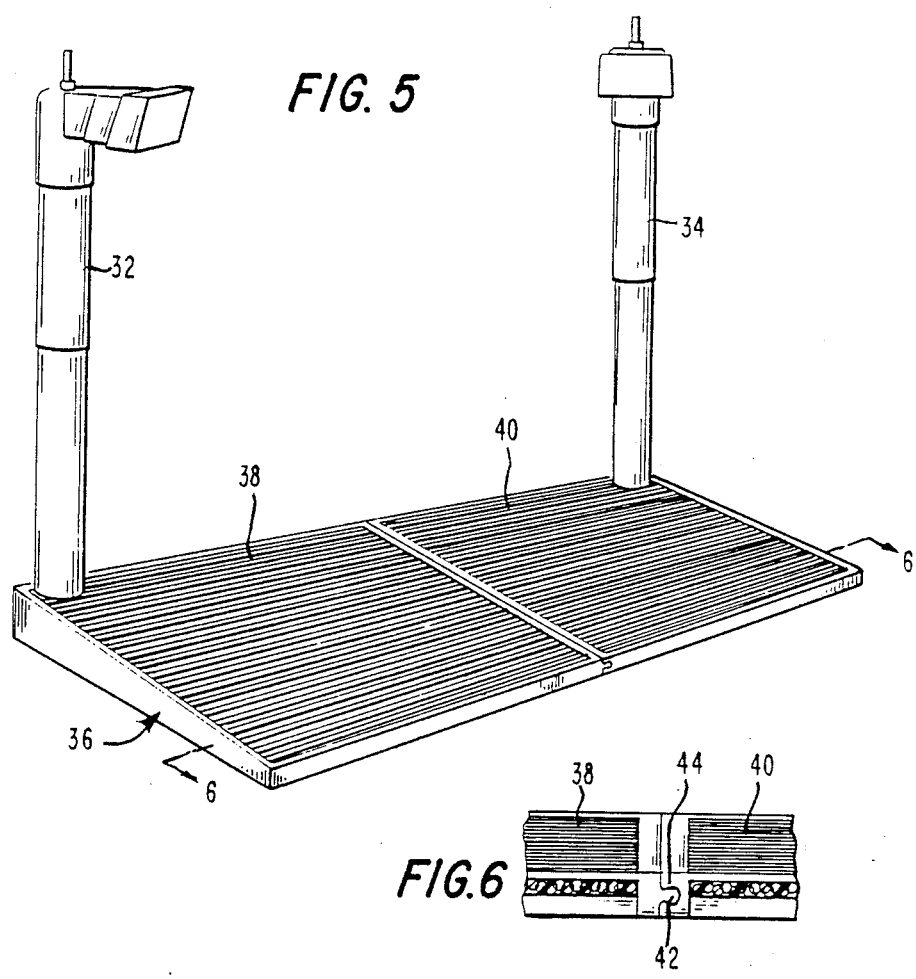
FIG. 5
FIG. 6
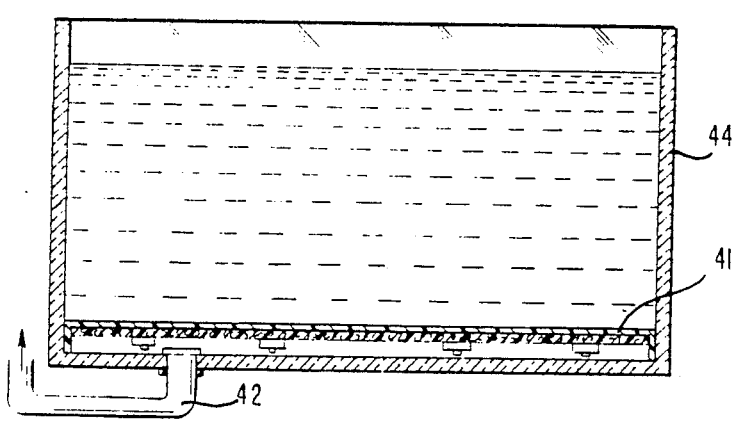
FIG. 7

– 1 –

WATER PURIFIER FOR AQUARIUMS

BACKGROUND OF THE INVENTION

1. Field of Invention

This invention relates to a water purification apparatus and system for aquariums and particularly to a system including external filter means in combination with a submerged member for promoting bacterial decay of waste particles.

2. Description of the Prior Art

It is recognized that nature's process for the purification of contaminated or polluted water generally occurs through the combination of a natural filtering system for the flowing or percolating water in combination with biochemical and/or bacteriological decay of the pollutants. In the normal aquarium environment, it has proven difficult to obtain the requisite balance as between bacterial growth to promote bacteriological decay without excessive build-up of bacterial colonies which make the water turbid and unsafe or the excessive build-up of the pH and toxic materials while providing proper filtration to remove particles not readily attacked by the bacteria, e.g. large size waste particles, from accumulating in the aquariums. Without the ability to provide proper purification, frequent time consuming cleaning and change of the aquarium water is required to maintain a healthy and aesthetically pleasing clear environment for the aquarium.

Various attempts have been made in the past to achieve a balanced purification system, but none have truly met the mark. For example, in U.S. Pat. No. 2,769,779 a porous water purifier embedded in a sand filter is provided which lodges waste-burning and nitrogen fixing bacteria. Water is drawn through the sand and purifier by means of a suction tube outlet in the purifier. The suction is induced by an aerator placed in a cylinder which surrounds the suction tube. The purifier is an agglomerated mass of small particles e.g. ceramic or plastic particles bonded together to entrain the bacteria. In this system, no means are provided for eliminating waste particles which are not readily attacked by the bacteria. Further, there is a tendency for clogging of this system, bacterial overgrowth and/or the accumulation of ammonia and/or other toxins. Also, cleaning of the aquarium becomes cumbersome due to the presence of sand or gravel which must be removed and cleaned and/or replaced.

In U.S. Pat. No. 3,135,238 there is described a filtering system which includes aeration. Here, an external filter for entrapment of large particles is provided together with a porous base plate filter lying on the bottom of the tank and embedded in gravel for removal of fine particles. This system does not employ bacterial action and depends upon the use of gravel for part of the filtration process. Hence, no provision is made for neutralization or metabolism of ammonia and other biodegradable toxic materials.

According to U.S. Pat. No. 4,556,485 an under-gravel filter is also provided wherein the filter medium is the gravel in the tank. As indicated therein, clogging is one other problem associated with such filters. In addition to the gravel, an internally located removable filter material is provided to improve the filtration efficiency of the gravel.

SUMMARY OF THE INVENTION

An aquarium purifier system comprises a porous raised platform, water lifting and/or circulating means for passing water from under the platform through a filter located external to the aquarium, a patterned bacterial growth and retention medium on the undersurface of the platform having porous land areas for the retention and growth of waste-removing, nitrogen fixing bacteria and small particle entrapment and open areas to allow for the easy passage of large waste particles which are removed through the circulating means and external filter.

The novel filter provides for a balance between waste-removal by bacterial action and filtration by an external filter. This configuration allows for easy and infrequent cleaning of the aquarium.

BRIEF DESCRIPTION OF THE DRAWINGS

FIG. 5 is an isometric view of another embodiment of the present invention.

FIG. 6 is a cross-sectional view along line 6—6 of FIG. 5.

FIG. 7 is a side elevational view of a third embodiment of the invention wherein filtering and flow is accomplished by passage of water through a hole provided in the aquarium rather than the purifier.

DETAILED DESCRIPTION OF THE INVENTION

The invention is described below with respect to specific embodiments. It should be understood however, that the invention contemplated is not limited to these embodiments which are merely exemplary of the invention.

Figure 1:
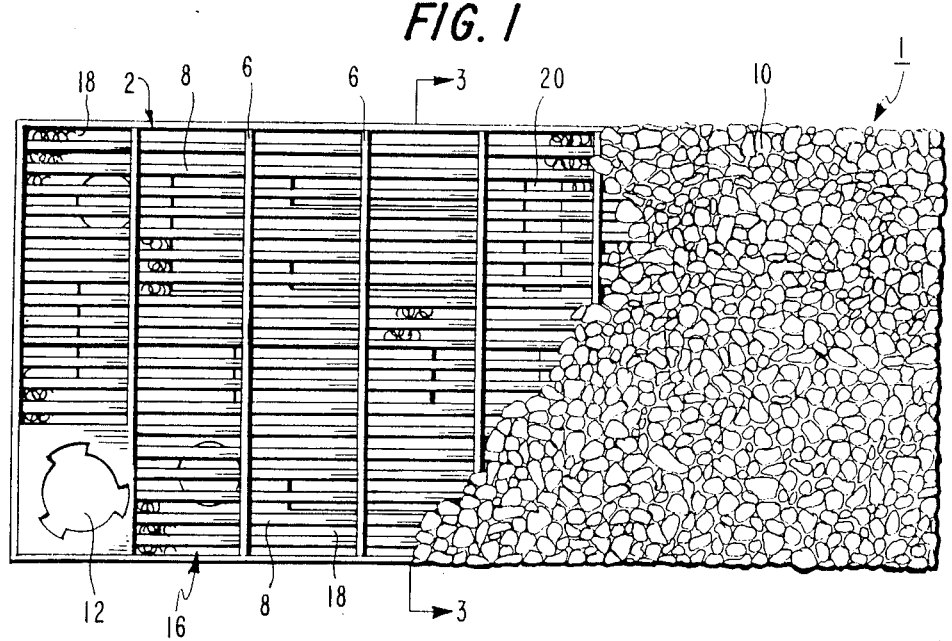
FIG. 1 is a top plan view of an aquarium purifier in accordance with the present invention.
Figure 2:
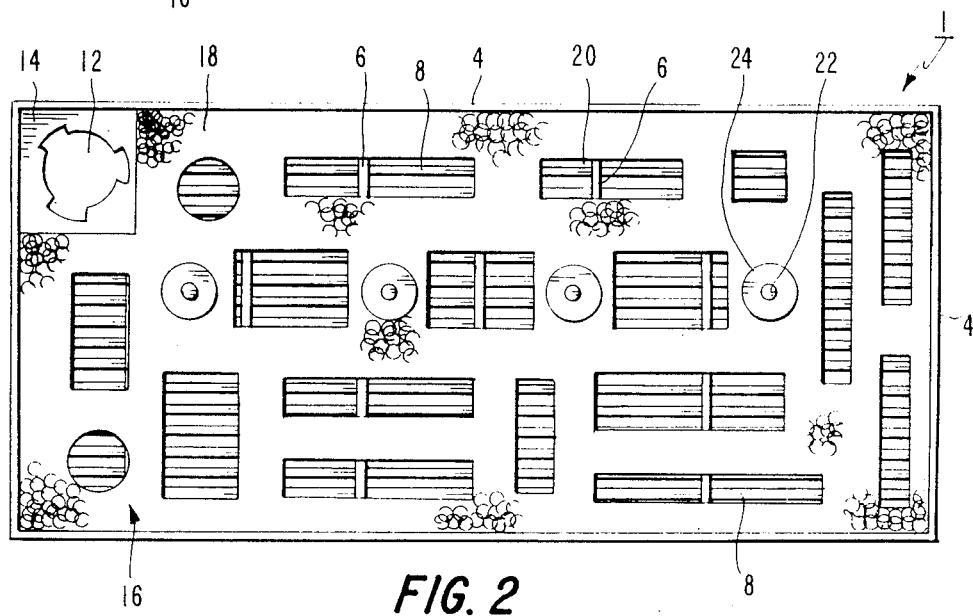
FIG. 2 is a bottom plan view of the embodiment shown in FIG. 1.
Figure 3:
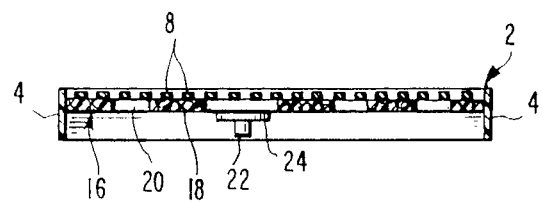
FIG. 3 is a side cross sectional view of the embodiment of FIG. 1 along lines 3—3.
Figure 4:
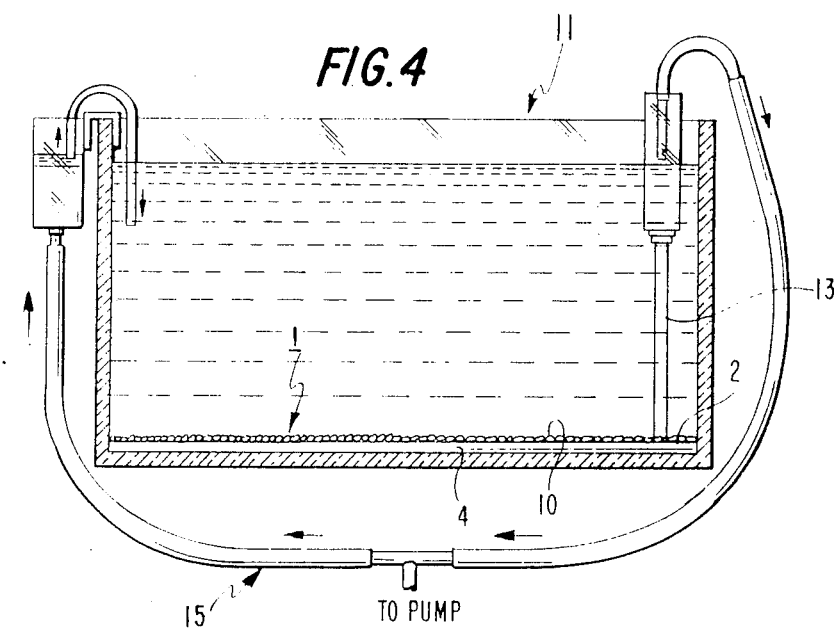
FIG. 4 is a side view of an aquarium having the aquarium purification system therein.

Referring to the embodiment depicted in FIGS. 1–4, there is shown an aquarium purification device 1 which, in use, rests at the bottom of the aquarium 11, preferably conforming in size and shape of the inside dimensions of the aquarium 11 so as to cover the entire bottom thereof.

The device 1 comprises a platform 2 which is raised from the bottom of the aquarium 11 by means of side walls 4. The platform 2 has a grate-like construction having a plurality of parallel spaced support ribs 6 along its width and a multiplicity of regularly spaced parallel members 8 perpendicular to and between the support ribs 6. The array of spaced members 8 provides a porous or slotted (grate-like) platform through which water can readily flow. It should be understood that the particular means for providing water flow through the platform 2 is not material. For example, the platform 2 could simply be made from a highly foraminous but rigid material or the flow could be provided by means of a multiplicity of holes in the platform 2. Optionally, for purposes of controlling the flow rate through the platform, while at the same time providing an aesthetically pleasing aquarium bottom surface, one may adhere a layer of pebbles 10 or gravel of appropriate size to the platform surface using any known, water insoluble binder or cement.

In this embodiment, the platform 2 is also provided with at least one notched hole 12 used for mounting a lift tube 13. The lift tube 13 is connected by conventional means to an external pump and filter assembly 15 as is well known in the art.

A feature of the present invention is the inclusion on the bottom surface 14 of the platform 2 of a removable bacterial growth and retention member 16 which provides a land area 18 for the entrapment of small waste particles which are readily metabolized by waste-removing bacteria which are retained and grown thereon. The member 16 preferably has a plurality of spaced openings 20 around which the land areas 18 lie. The openings 20 readily allow large waste particles to pass therethrough and thence out of the aquarium through the lift tube 13 and into the external filter provided as mentioned above. One preferable material for use as the bacterial retention member 16 is a fibrous or foam-like sheet of an inert polymer such as a low density polyethylene, polypropylene or polystyrene foam or the like. The member 16 is held in place by means of a plurality of mounting posts 22 which extend downwardly from the undersurface 14 of the platform 2 through which the member 16 is placed. A rubber grommet or washer 24 is placed on each of the posts 22 over the member 16 to secure it to the platform 2. With this arrangement the bacteria retention member 16 can easily be cleaned and/or replaced. It is also contemplated, in order to further promote the retention and growth of the waste-removing bacteria on the member 16, to coat or otherwise treat the member 16 with a film of a bacterial growth medium, such as agar-agar or other appropriate media, as is well known in bacteriological laboratories.

The platform member 2 is preferably made of a molded plastic so as to provide a low cost device. However, any other suitable material, e.g. aluminum, stainless steel, ceramic materials or the like can also be employed. Further, one can mold the surface of the platform so as to provide a pebble-like or other aesthetically pleasing appearance rather than adhering pebbles to the surface to attain such appearance.

In operation, the platform device 1 is placed in the aquarium 11 and coupled to the lift tube 13 and external pump and filtering means 15. If desired, one may further promote the growth of bacteria on member 16 by treating the member and/or the water with an appropriate solution or other media containing the waste-removing and/or nitrogen fixing bacteria. The pumping means is activated causing water to flow through the platform 2 and underlying bacterial retention member 16 and thence up the lift tube 13 and through the external filter and finally back to the aquarium 11. During the process, smaller waste particles become entrapped in the bacterial growth member 15 and are metabolized by the bacteria thereon while larger particles tend to be carried out of the tank as they pass through the higher flow rate areas due to the large openings in the member 16 and become entrapped in the external filter which is easily cleaned and/or replaced as necessary. Further, the presence of an appropriate level of bacterial growth metabolize and neutralize the ammonia and urea which otherwise tends to build up in the aquarium from the liquid waste produced by the fish. Also, since no loose gravel or sand is required, removal of the purification system for cleaning or replacement of member 16 is easily accomplished. Moreover, by providing the bacterial growth media, a balance is able to be achieved wherein the bacteria can digest smaller waste particles and reduce and metabolize other toxic waste material (e.g. the ammonia, urea and the like) while larger waste particles are removed from the aquarium, thereby requiring less frequent cleaning of the aquarium.

Referring to FIGS. 5 and 6, there is shown another embodiment which employs two lift tubes 32 and 34 to promote increased flow. The lift tubes can be of the telescoping type which have adjustable heights as is known in the art so as to fit all aquarium heights and may be provided with a carbon or fiberglass filter as is also known in the art. The platform 36 as shown in this embodiment is sloped downwardly from the lift tubes for greater efficiency. Further, the platform 36, as can best be seen with reference to FIG. 6, is comprised of two sections 38 and 40 which are provided with mating edges to snap or otherwise fit together to form a single platform member. In this way, one may make a purification platform of almost any size by simply coupling individual smaller sections of platform. In the embodiment shown, coupling is by means of a tongue 42 and groove 44 arrangement which snaps or snugly fits one to the other. However, any coupling means may be utilized.

Referring to FIG. 7, there is shown still another embodiment wherein, rather than providing a lift tube mounted through a purification platform 41, means for causing circulation and filtering is provided through a sealed tube 42 through the bottom of the aquarium 44 which is coupled to an external water circulating pump and filter assembly (not shown).

What is claimed is:

1. An aquarium purifier system comprises a porous raised platform member adapted to lie over the bottom of an aquarium, water circulating and filtering means for permitting its passage of water passing from the aquarium through the platform to be removed from under the platform for filtration thereof and return to the aquarium, a patterned bacterial growth and retention member secured to the underside of the platform said member having porous land areas for the retention and growth of waste removing, nitrogen fixing bacteria and particle entrapment and open areas which permits the passage of large waste particles to pass therethrough for removal through said water circulating and filtering means.

2. The aquarium purifier system recited in claim 1 wherein the outer surfaces of said porous raised platform member has the appearance of pebbles or gravel.

3. The aquarium purifier system recited in claim 2 wherein the outer surfaces of said platform member comprises pebbles or gravel adhered thereto.

4. The aquarium purifier system recited in claim 2 wherein said platform member is formed of a molded plastic having a nonplanar, pebble-like surface appearance.

5. The aquarium purifier system recited in claim 1 wherein said platform member is a molded plastic member having slot-like openings through the top thereof.

6. The aquarium purifier system recited in claim 5 further comprising at least one lift tube and an opening in said platform member for securing each of said lift tubes therein.

7. The aquarium purifier system recited in claim 6 wherein said lift-tube is coupled to a water pump and an external filter.

8. The aquarium purifier system recited in claim 7 wherein the height of said lift-tube is adjustable.

9. The aquarium purifier system recited in claim 1 wherein said platform member comprises means for interlocking a plurality of such members, one to the other.

10. The aquarium purifier system recited in claim 1 including an aquarium tank having a hole in the bottom thereof and wherein said water circulating and filter means are coupled to said hole.

11. The device recited in claim 10 wherein the outer surface thereof has a pebbled appearance.

12. The aquarium purifier system recited in claim 1 wherein said platform member includes means for retaining said patterned bacterial growth and retention member.

13. The aquarium purifier system recited in claim 1 wherein said bacterial growth and retention member is formed of a low density foam type material.

14. The aquarium purifier system recited in claim 13 wherein said foam is formed from polystyrene, polypropylene or polyethylene.

15. The aquarium purifier system recited in claim 1 wherein said bacterial growth and retention member has a bacterial growth promoting media on the surfaces thereof.

16. An aquarium purifier system comprises a porous raised platform member adapted to lie over the bottom of an aquarium, water circulating and filtering means for permitting the passage of water passing from the aquarium through the platform to be removed from under the platform for filtration thereof and return to the aquarium, a patterned bacterial growth and retention member on the underside of the platform said member having porous land areas for the retention and growth of waste removing, nitrogen fixing bacteria and particle entrapment and open areas which permits the passage of large waste particles to pass therethrough for removal through said water circulating and filtering means, and wherein said platform member has posts extending downwardly from the underside thereof and said bacterial growth and retention member is secured to said platform through said posts.

17. A device useful in an aquarium purification system comprises a member having an essentially horizontal platform and means extending therefrom for keeping said platform raised from any surface upon which the device lies, said platform having means for allowing the free flow of water therethrough, said device characterized by a porous bacterial growth and retention member affixed to the underside of said platform said member having land areas suitable for the retention and growth of bacteria and a plurality of openings for allowing large waste particles found in an aquarium to readily pass therethrough.

18. The device recited in claim 17 wherein said bacterial growth and retention member is a low density foam-like material.

19. An aquarium purification system comprising a platform which conforms to the area of the bottom of an aquarium tank and means extending from the platform for keeping said platform raised from the bottom of the tank, said platform having openings to allow the flow of water therethrough and said platform including at least one opening adapted for securing a lift-tube thereto, at least one lift tube secured to said platform at each lift tube opening in said platform, a porous bacterial growth and retention member secured to the underside of said platform said member having land areas and a plurality of openings therethrough and means for coupling said lift tube to an external pump and filter for causing water in the aquarium to be circulated in a manner such that the water passes through the platform and bacterial growth and retention members and thence up the lift tube through an external filter and then back to the tank.

* * * * *